(12) United States Patent
Telefus et al.

(10) Patent No.: US 7,755,914 B2
(45) Date of Patent: Jul. 13, 2010

(54) PULSE FREQUENCY TO VOLTAGE CONVERSION

(75) Inventors: Mark Telefus, Orinda, CA (US); Farza Bob Roohparvar, Monte Sereno, CA (US)

(73) Assignee: Flextronics AP, LLC, Broomfield, CO (US)

( * ) Notice: Subject to any disclaimer, the term of this patent is extended or adjusted under 35 U.S.C. 154(b) by 253 days.

(21) Appl. No.: 12/079,663

(22) Filed: Mar. 27, 2008

(65) Prior Publication Data

US 2008/0238379 A1 Oct. 2, 2008

Related U.S. Application Data

(60) Provisional application No. 60/921,220, filed on Mar. 29, 2007.

(51) Int. Cl.
H02M 3/335 (2006.01)
(52) U.S. Cl. .................................. 363/16; 363/21.03
(58) Field of Classification Search .................. 363/16, 363/21.02, 21.03
See application file for complete search history.

(56) References Cited

U.S. PATENT DOCUMENTS

| | | | | |
|---|---|---|---|---|
| 4,051,425 | A | 9/1977 | Smith | 363/86 |
| 4,712,160 | A | 12/1987 | Sato et al. | 361/388 |
| 4,788,626 | A | 11/1988 | Neidig et al. | 361/386 |
| 4,893,227 | A | 1/1990 | Gallios et al. | 363/26 |
| 4,899,256 | A | 2/1990 | Sway-Tin | 361/386 |
| 4,975,821 | A * | 12/1990 | Lethellier | 363/21.02 |
| 5,101,322 | A | 3/1992 | Ghaem et al. | 361/386 |
| 5,164,657 | A | 11/1992 | Gulczynski | 323/275 |
| 5,235,491 | A | 8/1993 | Weiss | 361/694 |
| 5,262,932 | A | 11/1993 | Stanley et al. | 363/26 |
| 5,295,044 | A | 3/1994 | Araki et al. | 361/709 |
| 5,490,052 | A | 2/1996 | Yoshida et al. | |
| 5,565,761 | A | 10/1996 | Hwang | 323/222 |

(Continued)

OTHER PUBLICATIONS

EE Times.com-"Team Claims Midrange Wireless Energy Transfer", by R. Colin Johnson, 4 pages, Nov. 6, 2007.

(Continued)

*Primary Examiner*—Shawn Riley
(74) *Attorney, Agent, or Firm*—Haverstock & Owens LLP

(57) ABSTRACT

A power supply apparatus and method of regulating is provided. A converter circuit includes a primary switching element and an auxiliary switching element. The auxiliary switching element is for transferring a reflected voltage signal. A transformer includes a primary and a secondary, the primary is coupled with the converter circuit. The primary and secondary each include a single winding. An output rectifier circuit is coupled with the secondary of the transformer. A resonant circuit is included in the converter circuit and is coupled with the primary. The resonant circuit includes one or more resonance capacitors that are configured for providing a transformer resonance. The transformer resonance comprises the reflected voltage signal, the capacitance of the one or more resonance capacitors and a parasitic capacitance of the transformer. The reflected voltage signal is reflected from the secondary to the primary. The resonant circuit converts a pulse train to produce a voltage potential, the voltage potential varying in proportion to an output voltage, the pulse train comprising a duty cycle proportional to a load current. A virtual output voltage feedback loop is provided. The converter circuit is responsive to a virtual output voltage reference signal in regulating an output voltage.

41 Claims, 9 Drawing Sheets

U.S. PATENT DOCUMENTS

| | | | |
|---|---|---|---|
| 5,565,781 A | 10/1996 | Dauge | 324/403 |
| 5,592,128 A | 1/1997 | Hwang | 331/61 |
| 5,673,185 A | 9/1997 | Albach et al. | |
| 5,712,772 A | 1/1998 | Telefus et al. | 363/21 |
| 5,742,151 A | 4/1998 | Hwang | 323/222 |
| 5,747,977 A | 5/1998 | Hwang | 323/284 |
| 5,798,635 A | 8/1998 | Hwang et al. | 323/222 |
| 5,804,950 A | 9/1998 | Hwang et al. | 323/222 |
| 5,811,895 A | 9/1998 | Suzuki et al. | 307/125 |
| 5,818,207 A | 10/1998 | Hwang | 323/288 |
| 5,870,294 A | 2/1999 | Cyr | 363/41 |
| 5,894,243 A | 4/1999 | Hwang | 327/540 |
| 5,903,138 A | 5/1999 | Hwang et al. | 323/266 |
| 5,905,369 A | 5/1999 | Ishii et al. | 323/272 |
| 5,923,543 A | 7/1999 | Choi | 363/21 |
| 6,058,026 A | 5/2000 | Rozman | |
| 6,069,803 A | 5/2000 | Cross | 363/21 |
| 6,091,233 A | 7/2000 | Hwang et al. | 323/222 |
| 6,160,725 A | 12/2000 | Jansen | 363/65 |
| 6,272,015 B1 | 8/2001 | Mangtani | 361/707 |
| 6,282,092 B1 | 8/2001 | Okamoto et al. | 361/704 |
| 6,344,980 B1 | 2/2002 | Hwang et al. | 363/210.1 |
| 6,366,483 B1 | 4/2002 | Ma et al. | |
| 6,396,277 B1 | 5/2002 | Fong et al. | 324/402 |
| 6,407,514 B1 | 6/2002 | Glaser et al. | 315/247 |
| 6,469,914 B1 | 10/2002 | Hwang et al. | 363/210.1 |
| 6,469,980 B1 | 10/2002 | Takemura et al. | 369/275.3 |
| 6,483,281 B2 | 11/2002 | Hwang | 323/299 |
| 6,531,854 B2 | 3/2003 | Hwang | 323/285 |
| 6,541,944 B2 | 4/2003 | Hwang | 323/225 |
| 6,605,930 B2 | 8/2003 | Hwang | 323/225 |
| 6,657,417 B1 | 12/2003 | Hwang | 323/222 |
| 6,671,189 B2 | 12/2003 | Jansen et al. | 363/21.14 |
| 6,674,272 B2 | 1/2004 | Hwang | 323/284 |
| 6,958,920 B2 | 10/2005 | Mednik et al. | 363/19 |
| 7,047,059 B2 | 5/2006 | Avrin et al. | 600/409 |
| 7,286,376 B2 | 10/2007 | Yang | |
| 2002/0011823 A1 | 1/2002 | Lee | 320/137 |
| 2003/0035303 A1 | 2/2003 | Balakrishnan et al. | 363/16 |
| 2004/0228153 A1 | 11/2004 | Cao et al. | 363/71 |
| 2005/0105224 A1 | 5/2005 | Nishi | 361/18 |
| 2005/0281425 A1 | 12/2005 | Greuet et al. | 381/331 |

OTHER PUBLICATIONS

EE Times.com-"Wireless Beacon Could Recharge Consumer Devices", by R. Colin Johnson, 3 pages, Nov. 6, 2007.

"New Architectures for Radio-Frequency dc/dc Power Conversion", Juan Rivas et al, Laboratory for Electromagnetic and Electronic Systems, Massachusetts Institute of Technology, Room 10-171 Cambridge, MA 02139, pp. 4074-4084, Jan. 2004.

Scollo, P. Fichera R., "Electronic Transformer for a 12V Halogen Lamp", Jan. 1999, ST Microelectronics pp. 1-4.

Office Action; U.S. Appl. No. 12/079,815, filed Mar. 27, 2008, mailed Feb. 4, 2010, 12 pages.

The Notification of Transmittal of the International Search Report and the Written Opinion of the International Searching Authority, or the Declaration; International Application No. PCT/US2009/065300, International Filing Date Nov. 20, 2009, 11 pages.

Bead Probe Handbook Successfully Implementing Agilent Medalist Bead Probes in Practice, "6 Test Fixturing", copyright Agilent Technologies, Inc., 2007, pp. 81-96.

SGS-Thomson Microelectronics Application Note, "An Automatic Line Voltage Switching Circuit", Vajapeyam Sukumar and Thierry Castagnet, copyright 1995 SGS-Thomson Microelectronics, Printed In Italy, 6 pages.

* cited by examiner

PULSE FREQUENCY TO VOLTAGE CONVERSION

RELATED APPLICATIONS

This patent application claims priority under 35 U.S.C. 119(e) of the U.S. Provisional Pat. App. No. 60/921,220, filed Mar. 29, 2007, entitled "PRIMARY ONLY CONSTANT VOLTAGE/CONSTANT CURRENT (CVCC) CONTROL IN QUASI RESONANT CONVERTOR," which is hereby incorporated by reference.

FIELD OF THE INVENTION

The present invention relates to the field of power supplies. More particularly, the present invention relates to a primary only controlled quasi resonant converter using pulse frequency to voltage conversion.

BACKGROUND

In many applications a voltage regulator is required to provide a voltage within a predetermined range. Some circuits are subject to uncertain and undesirable functioning and even irreparable damage if an input power supply fall outside a certain range.

A functional block diagram of a prior art power supply apparatus 10 is shown in FIG. 1. The apparatus 10 generally includes a power converter 12 coupled with a transformer 14 that is coupled with an output rectifier 16. The output rectifier 16 is coupled with an output capacitor 19 at an output Vout. A regulation circuit 15 comprising an opto-coupler 17 and a voltage reference and error amplifier 18 is coupled between the voltage converter 12 and the output Vout. The power converter 12 is configured to receive an unregulated DC voltage signal. The unregulated DC voltage signal is coupled to the transformer 14. The transformer 14 includes a primary 14P and a secondary 14S. The unregulated DC voltage signal drives the primary 14P to produce an intermediate voltage signal. The intermediate voltage signal comprises a stepped-up or stepped-down voltage signal derived from the voltage signal that drove the primary 14P. The intermediate voltage signal is coupled to the output rectifier 16. The output rectifier 16 rectifies the intermediate voltage signal to produce a regulated DC output voltage signal. A feedback signal provided by the opto-coupler 17 is coupled to the power converter for regulating the output voltage Vout.

A schematic diagram of a prior art regulated power supply 100 is shown in FIG. 1A. The power supply 100 includes a converter circuit 102 coupled with a transformer 140. The transformer 140 is coupled with an output circuit 106. The converter circuit 102 includes a capacitor 110 coupled across an input Vin and coupled with a primary 140P1 and 140P2 of the transformer 140. A primary switch 112A and an auxiliary switch 112B are coupled with the primary 140P1 and 140P2 respectively. A pulse width modulator (PWM) module 130 is coupled with a gate of the primary switch 112A. The output circuit 106 includes an output rectifying diode 146 and a load or an output capacitor 150 coupled across a secondary 140S of the transformer 140. The power supply 100 can include a voltage regulating circuit including optical coupler circuit 108 and a voltage reference and error amplifier 109. The power supply 100 uses the PWM module 130 to alter a duty cycle of the primary switch 112A. The optical coupler circuit 108 in cooperation with the voltage reference and error amplifier 109 provides feedback to the PWM module 130. The PWM module 130 accordingly adjusts the duty cycle of the primary switch 112A to compensate for any variances in an output voltage Vout. Very often the point of failure for the power supply 100 is the opto-coupler 108. The opto-coupler 108 and the voltage reference and error amplifier 109 increase production cost of the power supply 100.

Accordingly, it is desirable to create a regulated power supply to greatly reduce a point of failure and to reduce production cost.

SUMMARY OF THE INVENTION

In accordance with a first aspect of the present invention, a power supply apparatus is provided. The power supply apparatus includes a converter circuit including a primary switching element and an auxiliary switching element. The auxiliary switching element is for transferring a reflected voltage signal. A transformer includes a primary and a secondary, the primary is coupled with the converter circuit. The primary includes a single winding and the secondary includes a single winding. An output rectifier circuit is coupled with the secondary of the transformer. A resonant circuit is included in the converter circuit, the resonant circuit is coupled with the primary. The resonant circuit includes one or more resonance capacitors where the one or more resonance capacitors are configured for providing a transformer resonance. The transformer resonance comprises the reflected voltage signal, the capacitance of the one or more resonance capacitors and a parasitic capacitance of the transformer. The reflected voltage signal is received at the resonant circuit via the auxiliary switching element. The reflected voltage signal is reflected from the secondary to the primary. The resonant circuit converts a pulse train to produce a voltage potential, the voltage potential varying in proportion to an output voltage, the pulse train comprising a duty cycle proportional to a load current.

In an exemplary embodiment, the power supply apparatus includes a virtual output voltage feedback loop providing an output voltage reference signal to the converter circuit via the resonant circuit. The output voltage reference signal is generated from the reflected voltage signal. The converter circuit is responsive to the output voltage reference signal in regulating an output voltage. The voltage feedback circuit includes a voltage divider coupled with the primary for sampling the reflected voltage. The primary switching element and the auxiliary switching element each comprise an n-type MOSFET transistor. The first and the second resonance capacitors are coupled in parallel with the primary. A controller includes a pulse width modulation (PWM) circuit coupled with the primary switching element. The pulse width modulation (PWM) circuit is powered by the produced voltage potential. The converter circuit comprises a flyback converter.

In accordance with a second aspect of the present invention, a method of regulating a power supply apparatus is provided. The method includes generating a reflected voltage signal in a transformer comprising a primary and a secondary. The reflected voltage signal is reflected from the secondary to the primary where the primary is coupled with a converter circuit. The primary includes a single winding and the secondary includes a single winding. The reflected voltage signal is transferred from the primary to the converter circuit. The converter circuit includes a primary switching element and an auxiliary switching element. The auxiliary switching element is for transferring the reflected voltage signal. A transformer resonance is generated with a resonant circuit included in the converter circuit. The resonant circuit is coupled with the primary. The resonant circuit includes one or more resonance capacitors where the one or more resonance capacitors are configured for providing the transformer resonance. The one or more resonance capacitors and an inductance of the transformer form a resonant tank. A pulse train of the resonant circuit is converted to produce a voltage potential. The voltage potential varies in proportion to an output voltage. The pulse train comprises a duty cycle proportional to a load current. The transformer resonance comprises the reflected voltage signal, the capacitance of the one or more resonance capacitors and a parasitic capacitance of the transformer.

The reflected voltage is stored in the one or more resonance capacitors and transferred from the one or more resonance capacitors to a power terminal of the resonant circuit via the pulse train. The resonant tank increases a conversion rate of the pulse train to voltage potential conversion. The produced voltage potential is supplied to power a controller having a pulse width modulation (PWM) circuit coupled with the primary switching element. The produced voltage potential is supplied without using an additional transformer winding within the transformer. The reflected voltage is proportional to a factor of a capacitance of a first resonance capacitor divided by a second resonance capacitor. The produced voltage potential is proportional to the load current.

Other features of the present invention will become apparent from consideration of the following description taken in conjunction with the accompanying drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details and alternatives are set forth for the purpose of explanation. However, one of ordinary skill in the art will realize that the invention can be practiced without the use of these specific details. In other instances, well-known structures and devices are shown in block diagram form in order not to obscure the description of the invention with unnecessary detail.

Figure 1:
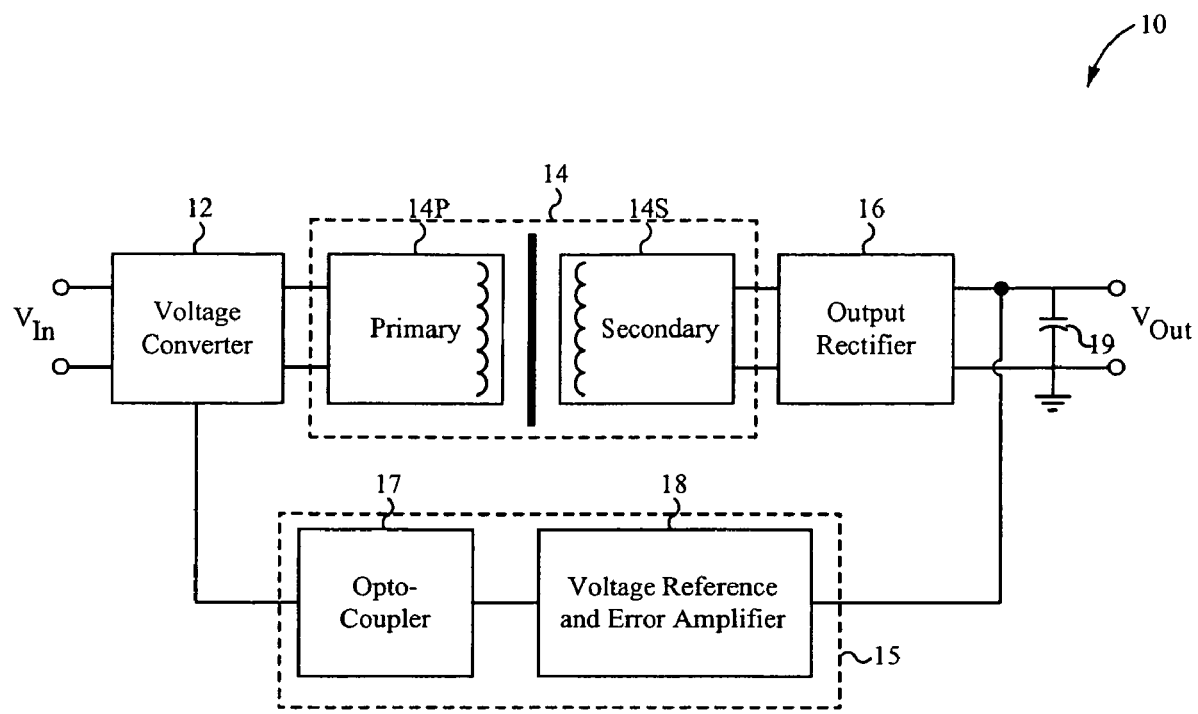
FIG. 1 illustrates a prior art functional block diagram of a power supply apparatus.
Figure 1A:
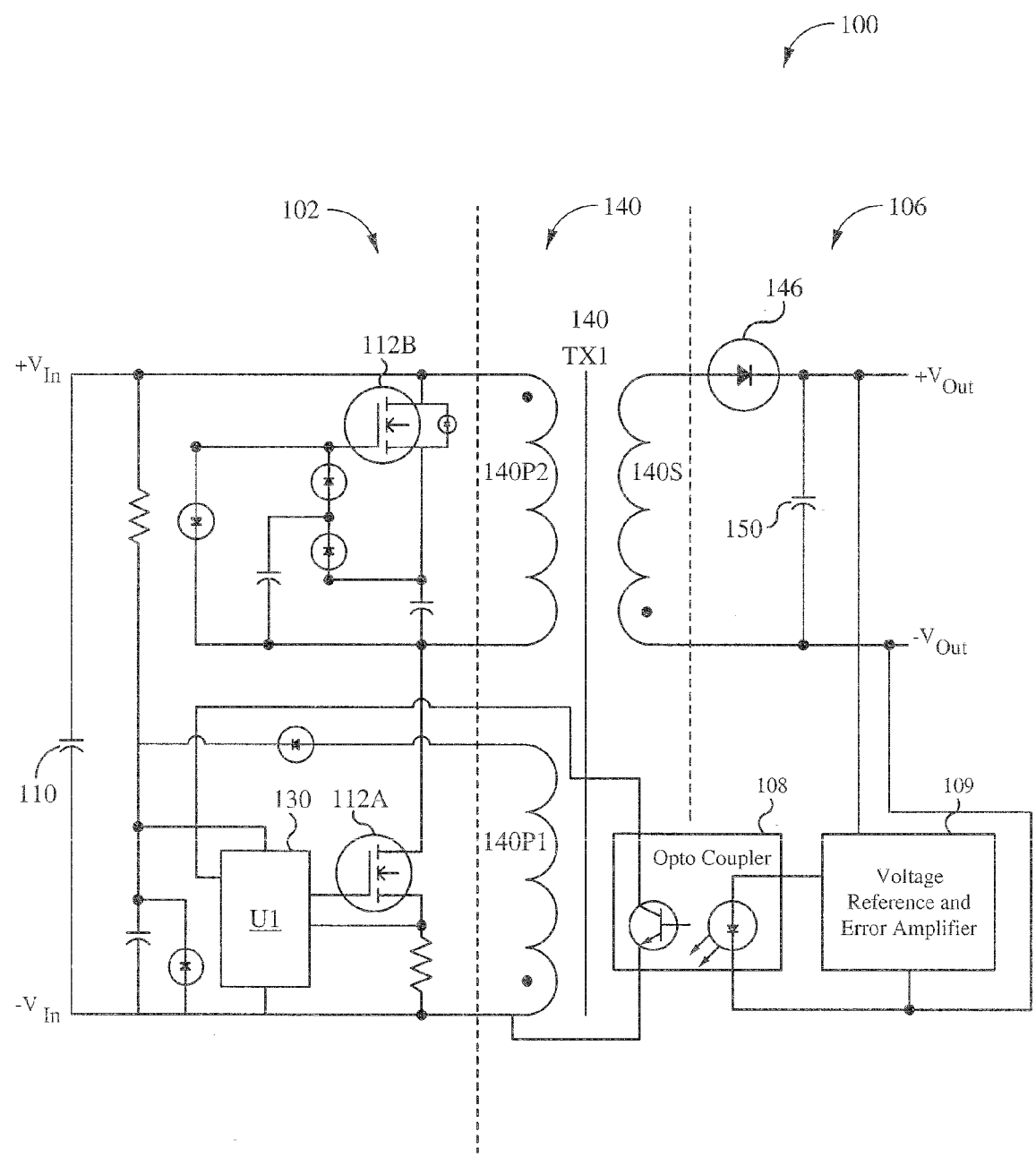
FIG. 1A illustrates a prior art schematic diagram of a power supply apparatus.
Figure 2:
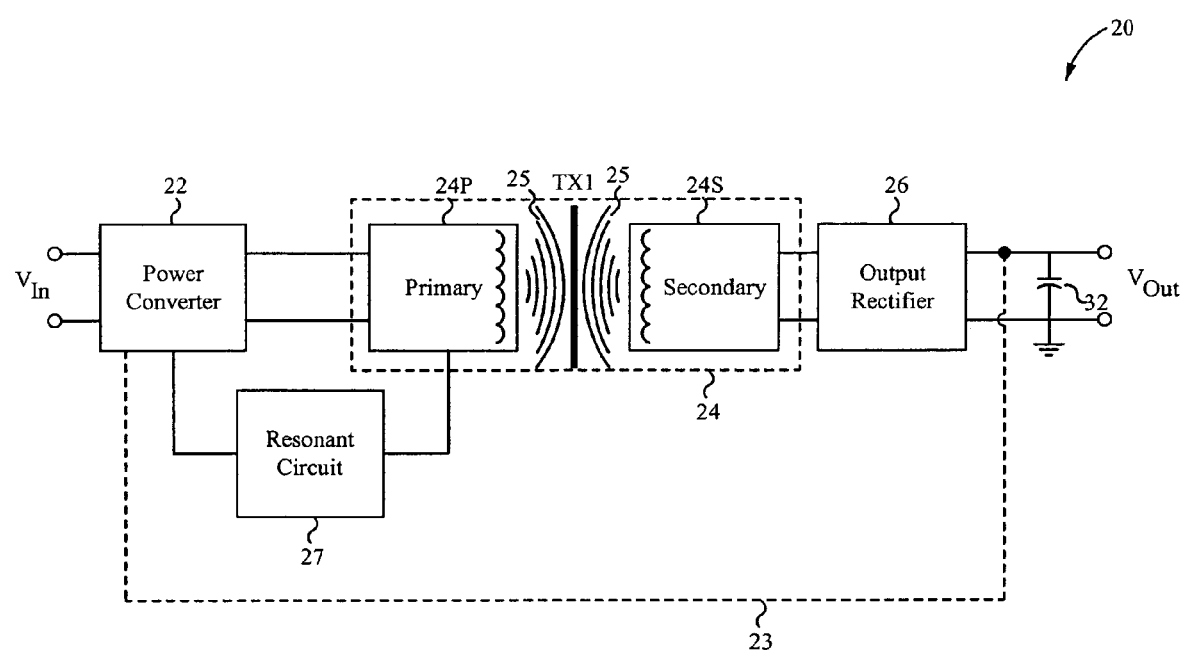
FIG. 2 illustrates a functional block diagram of a power supply apparatus in accordance with an embodiment of the invention.

Turning to FIG. 2, a functional block diagram is shown for a power supply apparatus 20 according to the present invention. The apparatus 20 generally includes a power converter 22 coupled with a transformer 24 that is coupled with an output rectifier 26. The output rectifier 26 is coupled with an output capacitor 32. The power converter 22 and the transformer 24 include a resonant circuit 27 coupled with there between. A virtual feedback loop 23 is coupled between the power converter 22 and the output capacitor 32.

The power converter 22 is configured to receive an unregulated DC voltage signal. The unregulated DC voltage signal is coupled to the transformer 24. The transformer 24 includes a primary 24P and a secondary 24S. The unregulated DC voltage signal drives the primary 24P to produce an intermediate voltage signal. The intermediate voltage signal comprises a stepped-up or stepped-down voltage signal derived from the voltage signal that drove the primary 24P. The intermediate voltage signal is coupled to the output rectifier 26. The output rectifier 26 rectifies the intermediate voltage signal to produce a DC output voltage signal.

A transformer resonance is generated in the transformer 24 using a reflected voltage signal and a parasitic capacitance, both qualities of the transformer 24, as an energy source. The reflected voltage signal 25 is reflected from the secondary 24S to the primary 24P. The reflected voltage signal 25 is transferred from the primary 24P to the power converter 22 via the resonant circuit 27. The resonant circuit 27 facilitates the transformer resonance by providing capacitive circuits used to exchange energy between the primary 24P and the resonant circuit 27. The reflected voltage signal 25 is used as an output voltage reference signal of the output voltage Vout to regulate the power converter 22. The virtual feedback loop 23 is realized by the resonant circuit 27 in cooperation with the primary 22 and the power converter 22. The resonant circuit 27 includes a pulse frequency to voltage conversion function. A pulse train of the resonant circuit 27 is converted to a voltage potential that varies in proportion to the output voltage Vout. The pulse train includes a duty cycle that is proportional to a load current of the output capacitor 32.

Figure 3:
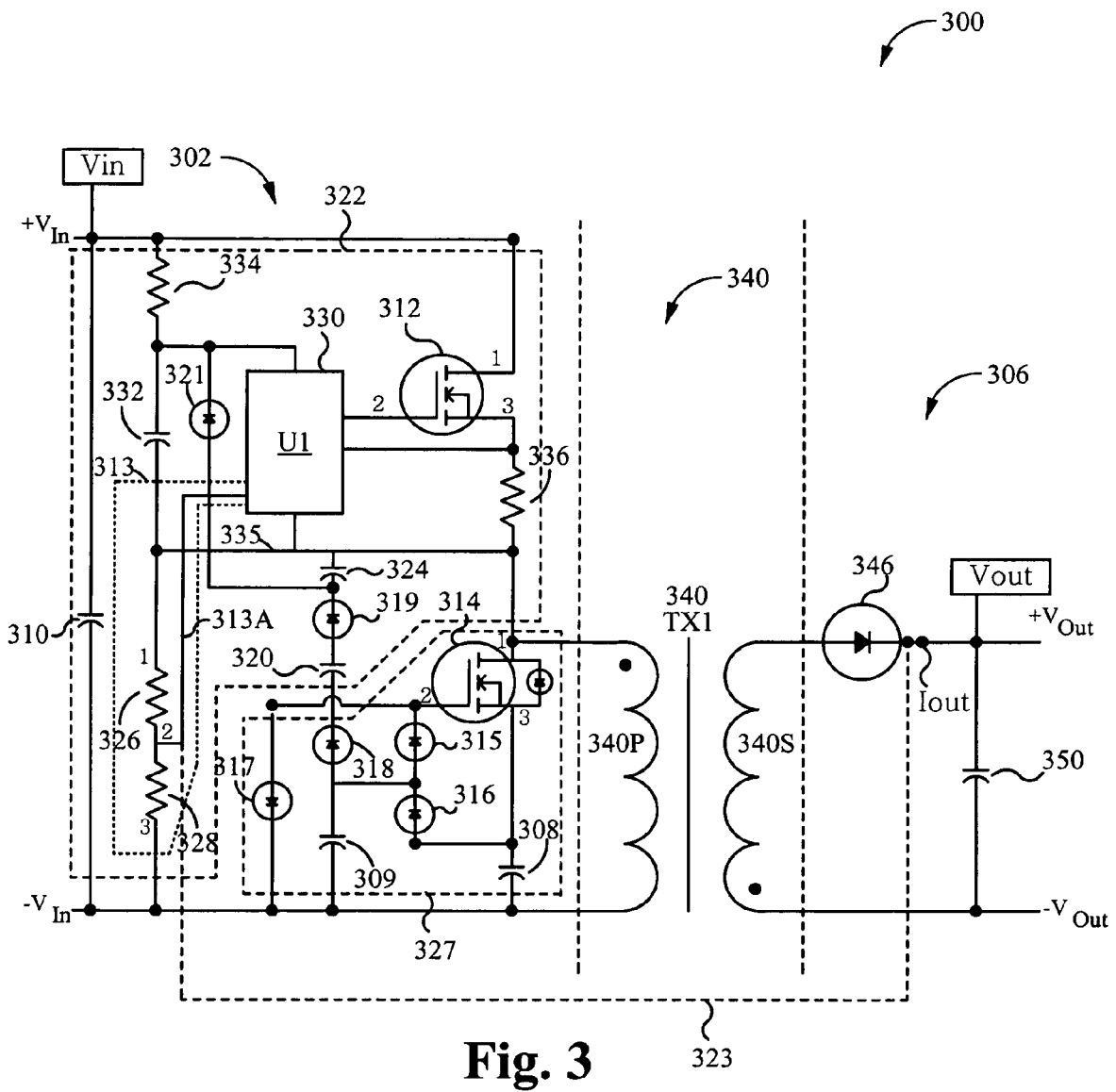
FIG. 3 illustrates a schematic diagram of a power supply apparatus in accordance with an embodiment of the invention.

Turning to FIG. 3, a schematic diagram is shown for a power supply apparatus 300 according to the present invention. The apparatus 300 generally includes a converter circuit 302 coupled with a transformer 340 that is coupled with an output circuit 306. The output circuit 306 is coupled with an output node Vout. A virtual output voltage feedback loop 323 is coupled between the converter circuit 302 and the output node Vout. The power supply apparatus 300 is configured to receive an unregulated DC voltage signal at an input node Vin and to provide a regulated output voltage Vout that is suitable for many low voltage appliances such as computer laptops, cell phones and other hand held devices. In an exemplary embodiment the output voltage Vout can be set within the range 5-40 VDC. Alternatively, the power supply apparatus can provide the output voltage Vout that is less than 5 VDC.

The converter circuit 302 is configured to receive the unregulated DC voltage signal. The converter circuit 302 includes a power converter 322, and a resonant circuit 327. In an exemplary embodiment, the converter circuit 302 comprises a flyback converter. Alternatively, the converter circuit 302 can comprise one of a forward converter, a push-pull converter, a half-bridge converter and a full-bridge converter. In yet other alternatives, the converter circuit 302 can comprise other configurations of switch mode power supplies known to a person of skill in the art. The resonant circuit 327 is coupled between a primary 340P of the transformer 340 and the power converter 322.

The power converter 322 includes a first terminal of a primary switching element or primary switch 312 coupled to the input node Vin. A second terminal of the primary switch 312 is coupled with a controller 330 and a third terminal of the primary switch 312 is coupled to a first terminal of a resistor 336 and coupled with the controller 330. A second terminal of the resistor 336 is coupled to a first terminal of the primary 340P. An input capacitor 310 is coupled across the input node Vin. A first terminal of a pull-up resistor 334 is coupled to the input node Vin. A second terminal of the pull-up resistor 334 is coupled with the controller 330. A capacitor 332 is coupled between the second terminal of the pull-up resistor 334 and a first terminal of a voltage divider 326, 328. A floating or virtual ground 335 is coupled between the second terminal of the resistor 336 and the first terminal of the voltage divider 326, 328. An output of the controller 330 is coupled to the floating ground 335. A second terminal of the voltage divider 326, 328 is coupled to the controller 330 and the third terminal of the voltage divider 326, 328 is coupled to a '−Vin' node. A first terminal of a capacitor 324 is coupled to the floating ground 335 and the second terminal of the capacitor 324 is coupled to a cathode of a diode 319. A cathode of a diode 321 is coupled to the second terminal of the resistor 334 and the anode of the diode 321 is coupled to the cathode of the diode 319. The anode of the diode 319 is coupled to a first terminal of a capacitor 320.

A voltage feedback circuit 313 is included in the power converter 322. The voltage feedback circuit comprises the voltage divider 326, 328 and a lead 313A coupled between an input of the controller 330 and the second terminal of the voltage divider 326, 328. The voltage feedback circuit 313 is coupled with the first terminal of the primary 340P through the floating ground 335. The voltage feedback circuit 313 samples a reflected voltage that is described further below. The voltage feedback circuit 313 can be used to regulate the output voltage Vout.

The primary switch 312 comprises a suitable switching device. In an exemplary embodiment, the primary switch 312 comprises an n-type metal-oxide-semiconductor field-effect transistor (MOSFET) device. Alternatively, any other semiconductor switching device known to a person of skill in the art can be substituted for the primary switch 312. The controller 330 includes a pulse width modulation (PWM) circuit. The controller 330 regulates the duty cycle of the primary switch 312 with the PWM circuit. The controller 330 can include a current comparator circuit (not shown) to use with a current feedback circuit (not shown) in regulating the duty cycle of the primary switch 312. Likewise, the controller 330 can include a voltage comparator circuit (not shown) to use with the voltage feedback circuit 313 in regulating the duty cycle of the primary switch 312.

The resonant circuit 327 includes a first terminal of an auxiliary switching element or auxiliary switch 314 coupled to the second terminal of the resistor 336 and coupled to the first terminal of the primary 340P. The second terminal of the auxiliary switch is coupled to a cathode of a diode 315 and coupled to an anode of a diode 317. A cathode of the diode 317 is coupled to the −Vin node. A third terminal of the auxiliary switch 314 is coupled to a first terminal of a first resonance capacitor 308. A second terminal of the first resonance capacitor 308 is coupled to the −Vin node and coupled to a second terminal of the primary 340P. A cathode of a diode 318 is coupled to a second terminal of the capacitor 320 and a anode of the diode 318 is coupled to a first terminal of a second resonance capacitor 309 and coupled to an anode of the diode 315. A second terminal of the second resonance capacitor 309 is coupled to the −Vin node. A cathode of a diode 316 is coupled to the anode of the diode 315 and an anode of the diode 316 is coupled to the first terminal of the first resonance capacitor 308. The first and second resonance capacitors 308, 309 are coupled in parallel with the primary 340P. Alternatively, the resonance capacitors can comprise a series resonant circuit coupled with the primary 340P.

A resonant tank of the resonant circuit 327 includes the first and second resonance capacitors 308, 309 coupled with the diodes 315, 316 and 317 which are coupled with the auxiliary switch 314 which is coupled in series with the first resonance capacitor 308, both the first resonance capacitor 308 and the auxiliary switch 314 are coupled in parallel across the primary 340P. The resonant tank functions as a DC generator when oscillating to produce a voltage potential. The produced voltage potential can be used to power the controller 330. A charge pump comprising the capacitor 320, the diode 319 and the capacitor 324 is used to store and to couple the produced voltage potential to the controller 330 through the diode 321. The auxiliary switch 314 cycles on and off as the resonant tank oscillates to produce a turn-on voltage for the auxiliary switch 314. The turn-on voltage is a voltage value required to operate or "turn-on" the auxiliary switch 314. The turn-on voltage is generated with the reflected voltage and an oscillation energy of the resonant tank. The turn-on voltage value can depend on a capacitance chosen for the first and the second resonance capacitors 308, 309. The produced voltage potential can also depend on the capacitance chosen for the first and the second resonance capacitors 308, 309.

The transformer 340 comprises the primary 340P and a secondary 340S. In an exemplary embodiment, the primary 340P and the secondary 340S can each comprise a single winding. The output circuit 306 includes a rectifier diode 346 and an output capacitor 350. An anode of the rectifier diode 346 is coupled to a first terminal of the secondary 340S. A cathode of the rectifier diode 346 is coupled to a first terminal of the output capacitor 350 and coupled to the output node Vout. A second terminal of the output capacitor 350 is coupled to a −Vout node and coupled to a second terminal of the secondary 340S. Alternatively, the output circuit 306 can include an output rectifier circuit comprising a half-wave rectifier. In still another embodiment, the output circuit 306 can include an output rectifier circuit comprising a full-wave rectifier. A transformer resonance is generated in the transformer 340 using the reflected voltage and parasitic capacitance of the transformer 340 and a capacitance of the first and second resonance capacitors 308, 309.

The auxiliary switch 314 comprises a suitable switching device. In an exemplary embodiment, the auxiliary switch 314 comprises an n-type metal-oxide-semiconductor field-effect transistor (MOSFET) device. Alternatively, any other semiconductor switching device known to a person of skill in the art can be substituted for the auxiliary switch 314.

The virtual output voltage feedback loop 323 provides a virtual output voltage reference signal to the power converter 322 via the resonant circuit 327. The resonant circuit 327 in cooperation with the primary 340P and the power converter 322 provides the virtual output voltage feedback loop 323. The virtual output voltage reference signal is generated from the reflected voltage signal. The power converter 322 is responsive to the virtual output voltage reference signal in regulating the output voltage Vout. The voltage feedback circuit 313 including the voltage divider 326, 328 is coupled with the primary 340P for sampling the reflected voltage signal and providing the sampled reflected voltage signal to the controller 330. The resonant circuit 327 also allows control of a reset timing of the transformer and a zero current for the rectifier diode 346.

Figure 4:
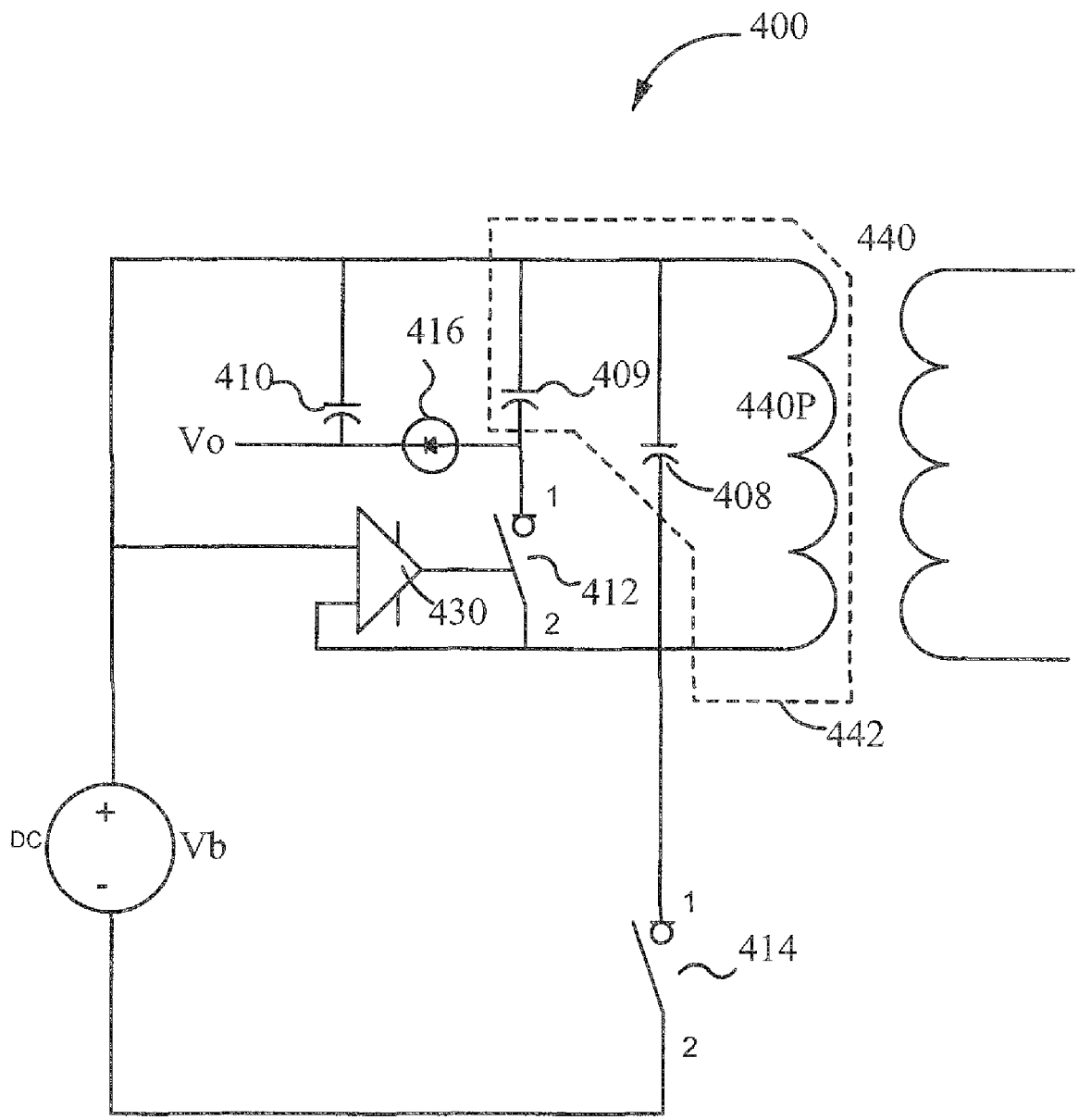
FIG. 4 illustrates a functional schematic diagram of resonant circuit of a power supply apparatus in accordance with an embodiment of the invention.

Turning to FIG. 4, a functional schematic diagram is shown for a resonant circuit 400 in accordance with the present invention. A first terminal of a capacitor 410 is coupled to a positive terminal of a DC source 'Vb'. The second terminal of the capacitor 410 is coupled with a cathode of a diode 416 and coupled with a power terminal 'Vo'. A first terminal of a first resonance capacitor 409 is coupled with the positive terminal of the DC source Vb. The second terminal of the first resonance capacitor 409 is coupled with an anode of the diode 416 and coupled with a first terminal of the switch 412. A first terminal of a second resonance capacitor 408 is coupled with the first terminal of the first resonance capacitor 409 and coupled with a first terminal of a primary 440P. The second terminal of the second resonance capacitor 408 is coupled to a first terminal of the switch 414. A negative terminal of the DC source Vb is coupled to a second terminal of the switch 414. A second terminal of the primary 440P is coupled with a second terminal of the switch 412 and coupled with an inverting input of an operational amplifier or op-amp 430. A non-inverting input of the op-amp 430 is coupled with the positive terminal of the DC source Vb. An output of the op-amp 430 is coupled with a third terminal of the switch 412.

The resonant circuit 400 includes a pulse frequency to voltage conversion function. A pulse train of the resonant circuit 400 is generated within a resonant tank 442 including an inductance of the primary 440P and a first and second resonance capacitor 409, 408. The pulse train is converted to a voltage potential Vo. The first and second resonance capacitors 409, 408 store reflected voltage from the primary 440P and transfer the stored voltage to the power terminal Vo. The pulse train includes a frequency that increases in proportion to a load current. The op-amp 430 amplifies the DC voltage generated by the DC voltage source Vb as a factor of the frequency of the pulse train generated in the resonant tank 442. The amplified voltage is controlled and regulated using the reflected voltage Vr of the primary 440P. Thus a voltage generated by the resonant circuit 400 for coupling to an output load is regulated without using opto-couplers. The voltage potential Vo can be used to power an IC controller circuit such as the controller 330. (See FIG. 3). The voltage potential Vo can be defined by equation (1).

$$Vo = Vr \times C2 \times ton / (C1 + C2) \quad (1)$$

Figure 5:
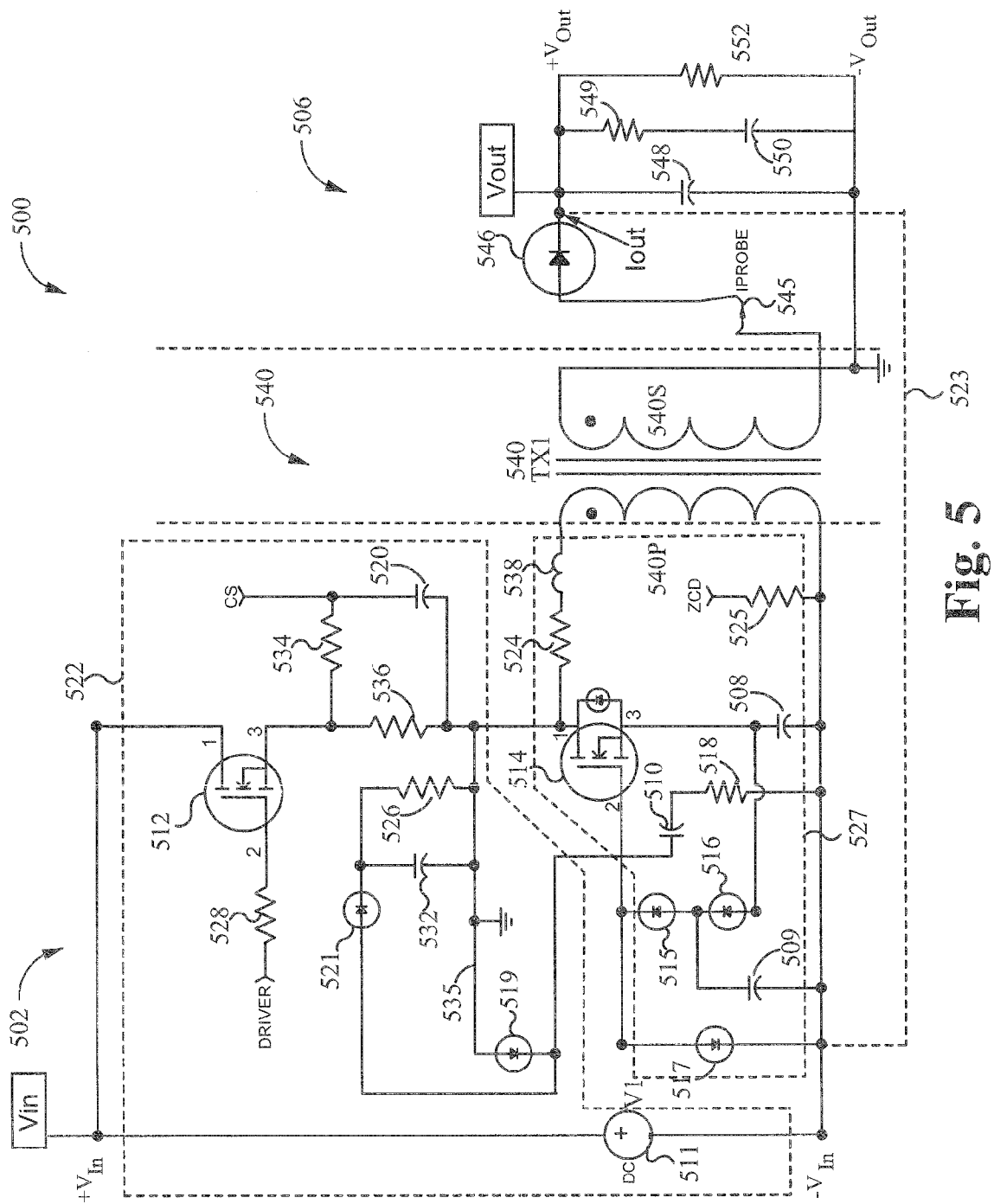
FIG. 5 illustrates a schematic diagram of a power supply apparatus in accordance with an alternative embodiment of the invention.

Turning to FIG. 5, a schematic diagram is shown for a power supply apparatus 500 according to an alternative embodiment of the present invention. The apparatus 500 generally includes a converter circuit 502 coupled with a transformer 540 that is coupled with an output circuit 506. The output circuit 506 is coupled with an output node Vout. A virtual output voltage feedback loop 523 is coupled between the converter circuit 502 and the output node Vout. The power supply apparatus 500 is configured to receive an unregulated DC voltage signal at an input node Vin and to provide a regulated output voltage Vout that is suitable for many low voltage appliances as stated above. In an exemplary embodiment the output voltage Vout can be set within the range 5-40 VDC. Alternatively, the power supply apparatus can provide the output voltage Vout that is less than 5 VDC.

The converter circuit 502 is configured to receive the unregulated DC voltage signal. The converter circuit 502 includes a power converter 522 and a resonant circuit 527. In an exemplary embodiment, the converter circuit 502 comprises a flyback converter. Alternatively, the converter circuit 502 can comprise one of a forward converter, a push-pull converter, a half-bridge converter and a full-bridge converter. In yet other alternatives, the converter circuit 502 can comprise other configurations of switch mode power supplies known to a person of skill in the art. The resonant circuit 527 is coupled between a primary 540P of the transformer 540 and the power converter 522.

The power converter 522 includes a first terminal of a primary switching element or primary switch 512 coupled to the input node Vin. A second terminal of the primary switch 512 is coupled with a first terminal of a resistor 528 and a third terminal of the primary switch 512 is coupled to a first terminal of a resistor pair 534, 536. A second terminal of the resistor 528 is coupled to a 'DRIVER' node. A second terminal of the resistor 534 is coupled to a 'CS' node and coupled to a first terminal of a capacitor 520. A second terminal of the capacitor 520 is coupled with a second terminal of the resistor 536 and coupled with a floating ground or ground 535. A first terminal of a resistor 526 is coupled with a first terminal of a capacitor 532 and coupled with a cathode of a diode 521. A second terminal of the capacitor 532 and the resistor 526 are coupled with the ground 535. An anode of the diode 521 is coupled with a cathode of a diode 519 and coupled with the resonant circuit 527. An anode of the diode 519 is coupled to ground 535. A DC source 511 is coupled across the input node Vin.

A voltage feedback circuit (not shown) similar to the previous embodiment can be included in the power converter 522. The voltage feedback circuit can include a voltage divider (not shown) coupled across the input node Vin and coupled to a controller (not shown) that is coupled to the DRIVER node. The voltage feedback circuit can be coupled with the first terminal of the primary 540P through the floating ground 535. The voltage feedback circuit can sample a reflected voltage that is described further below. The voltage feedback circuit can be used to regulate the output voltage Vout.

The primary switch 512 comprises a suitable switching device. In an exemplary embodiment, the primary switch 512 comprises an n-type metal-oxide-semiconductor field-effect transistor (MOSFET) device. Alternatively, any other semiconductor switching device known to a person of skill in the art can be substituted for the primary switch 512. The controller (not shown) can include a pulse width modulation (PWM) circuit. The controller regulates the duty cycle of the primary switch 512 with the PWM circuit. The controller can include a current comparator circuit (not shown) to use with a current feedback circuit (not shown) in regulating the duty cycle of the primary switch 512. Likewise, the controller can include a voltage comparator circuit (not shown) to use with the voltage feedback circuit (not shown) in regulating the duty cycle of the primary switch 512.

The resonant circuit 527 includes a first terminal of an auxiliary switching element or auxiliary switch 514 coupled to the second terminal of the resistor 536 and coupled to the first terminal of the primary 540P through the resistor 524 and the inductor 538. The second terminal of the auxiliary switch 514 is coupled to a cathode of a diode 515 and coupled to an anode of a diode 517. A cathode of the diode 517 is coupled to a second terminal of the primary 540P. A third terminal of the auxiliary switch 514 is coupled to a first terminal of a first resonance capacitor 508. A second terminal of the first resonance capacitor 508 is coupled to a first terminal of a resistor 525 and coupled to a second terminal of the primary 540P. A second terminal of the resistor 525 is coupled to a 'ZCD' node. A first terminal of a second resonance capacitor 509 is coupled to an anode of the diode 515 and coupled to a cathode of a diode 516. A second terminal of the second resonance capacitor 509 is coupled with the cathode of the diode 517. A first terminal of a capacitor 510 is coupled with the cathode of the diode 519. A second terminal of the capacitor 510 is coupled with a first terminal of a resistor 518, and a second terminal of the resistor 518 is coupled with the second terminal of the primary 540P. The first and second resonance capacitors 508, 509 are coupled in parallel with the primary 540P. Alternatively, the resonance capacitors can comprise a series resonant circuit coupled with the primary 540P.

A resonant tank of the resonant circuit 527 includes the first and second resonance capacitors 508, 509 coupled with the diodes 515, 516 and 517 which are coupled with the auxiliary switch 514 which is coupled in series with the first resonance capacitor 508, both the first resonance capacitor 508 and the auxiliary switch 514 are coupled in parallel across the primary 540P. The resonant tank functions as a DC generator when oscillating to produce a voltage potential. The produced voltage potential can be used to power the controller (not shown). A charge pump (not shown) similar to the previous embodiment, can comprise one or more capacitors and a diode can be used to store and to couple the produced voltage potential to the controller. The auxiliary switch 514 cycles on and off as the resonant tank oscillates to produce a turn-on voltage for the auxiliary switch 514. The turn-on voltage is a voltage value required to operate or "turn-on" the auxiliary switch 514. The turn-on voltage is generated with the reflected voltage and an oscillation energy of the resonant tank. The turn-on voltage value can depend on a capacitance chosen for the first and the second resonance capacitors 508, 509. The produced voltage potential can also depend on the capacitance chosen for the first and the second resonance capacitors 508, 509.

The transformer 540 comprises the primary 540P and a secondary 540S. In an exemplary embodiment, the primary 540P and the secondary 540S can each comprise a single winding. The output circuit 506 includes a rectifier diode 546 and output capacitors 548, 550. An anode of the rectifier diode 546 is coupled to a probe 545 that is coupled to a second terminal of the secondary 540S. A cathode of the rectifier diode 546 is coupled to a first terminal of the output capacitor 548 and coupled to the first terminal of a resistors 549 and coupled to the output node Vout. A first terminal of a resistor 552 is also coupled to the output node Vout and the second terminal of the resistor 552 is coupled to a –Vout node. A second terminal of the output capacitor 550 is coupled to the –Vout node and coupled to a first terminal of the secondary 540S. A first terminal of the capacitor 550 is coupled to a second terminal of the resistor 549 and a second terminal of the capacitor 550 is coupled to the –Vout node. Alternatively, the output circuit 506 can include an output rectifier circuit comprising a half-wave rectifier. In still another embodiment, the output circuit 506 can include an output rectifier circuit comprising a full-wave rectifier. A transformer resonance is generated in the transformer 540 using the reflected voltage and parasitic capacitance of the transformer 540 and a capacitance of the first and second resonance capacitors 508, 509.

The auxiliary switch 514 comprises a suitable switching device. In an exemplary embodiment, the auxiliary switch 514 comprises an n-type metal-oxide-semiconductor field-effect transistor (MOSFET) device. Alternatively, any other semiconductor switching device known to a person of skill in the art can be substituted for the auxiliary switch 514.

The virtual output voltage feedback loop 523 provides a virtual output voltage reference signal to the power converter 522 via the resonant circuit 527. The resonant circuit 527 in cooperation with the primary 540P and the power converter 522 provides the virtual output voltage feedback loop 523. The virtual output voltage reference signal is generated from the reflected voltage signal. The power converter 522 is responsive to the virtual output voltage reference signal in regulating the output voltage Vout. The voltage feedback circuit (not shown) that can included a voltage divider (not shown) that is coupled with the primary 540P can sample the reflected voltage signal and provide the sampled reflected voltage signal to the controller (not shown). The resonant circuit 527 also allows control of a reset timing of the transformer and a zero current for the rectifier diode 546.

Figure 6:
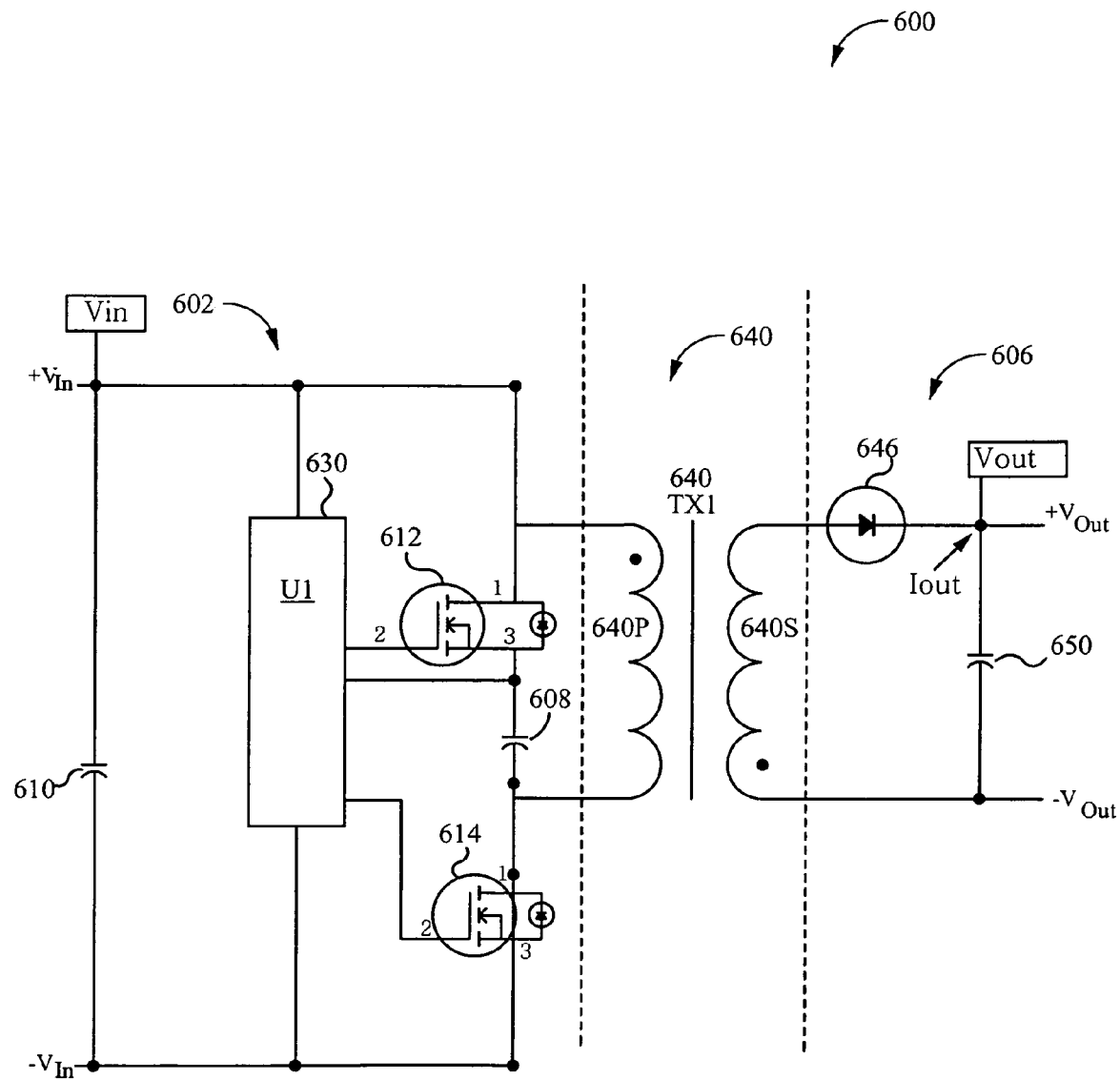
FIG. 6 illustrates a schematic diagram of a power supply apparatus in accordance with yet another embodiment of the invention.

Turning to FIG. 6, a schematic diagram is shown for a power supply apparatus 600 according to yet another embodiment of the present invention. The apparatus 600 generally includes a converter circuit 602 coupled with a transformer 640 that is coupled with an output circuit 606. The output circuit 606 is coupled with an output node Vout. A virtual output voltage feedback loop (not shown) similar to the previous embodiments can be coupled between the converter circuit 602 and the output node Vout. The power supply apparatus 600 is configured to receive an unregulated DC voltage signal at an input node Vin and to provide a regulated output voltage Vout that is suitable for many low voltage appliances such as computer laptops, cell phones and other hand held devices. In an exemplary embodiment the output voltage Vout can be set within the range 5-40 VDC. Alternatively, the power supply apparatus 600 can provide the output voltage Vout that is less than 5 VDC.

The converter circuit 602 is configured to receive the unregulated DC voltage signal. The converter circuit 602 includes a first terminal of a primary switching element or primary switch 612 coupled with an input node Vin and coupled with a first terminal of a primary 640P of the transformer 640. A second terminal of the primary switch is coupled to a controller 630 and a third terminal of the primary switch 612 is coupled with the controller 630 and coupled to a first terminal of a resonance capacitor 608. A second terminal of the resonance capacitor 608 is coupled to a second terminal of the primary 640P and coupled with a first terminal of an auxiliary switching element or an auxiliary switch 614. A second terminal of the auxiliary switch 614 is coupled with the controller 630 and a third terminal of the auxiliary switch 614 is coupled to a '–Vin' node. The controller is coupled to the Vin node and coupled to the –Vin node. The converter circuit 602 also includes an input capacitor 610 and a resonance capacitor 608.

The output circuit 606 includes a rectifier diode 646 and an output capacitor 650. An anode of the rectifier diode 646 is coupled to a first terminal of the secondary 640S. A cathode of the rectifier diode 646 is coupled to a first terminal of the output capacitor 650 and coupled to an output node Vout. A second terminal of the output capacitor 650 is coupled to a '–Vout' node and coupled to a second terminal of the secondary 640S. The controller 630 is configured to drive the primary switch 612 and the auxiliary switch 614. The resonance capacitor 608 is configured to function similar to the previous embodiment as a resonant tank with an inductance of the transformer 640. The transformer 640 comprises the primary 640P and the secondary 640S. In an exemplary embodiment, the primary 640P and the secondary 640S can each comprise a single winding.

Figure 7:
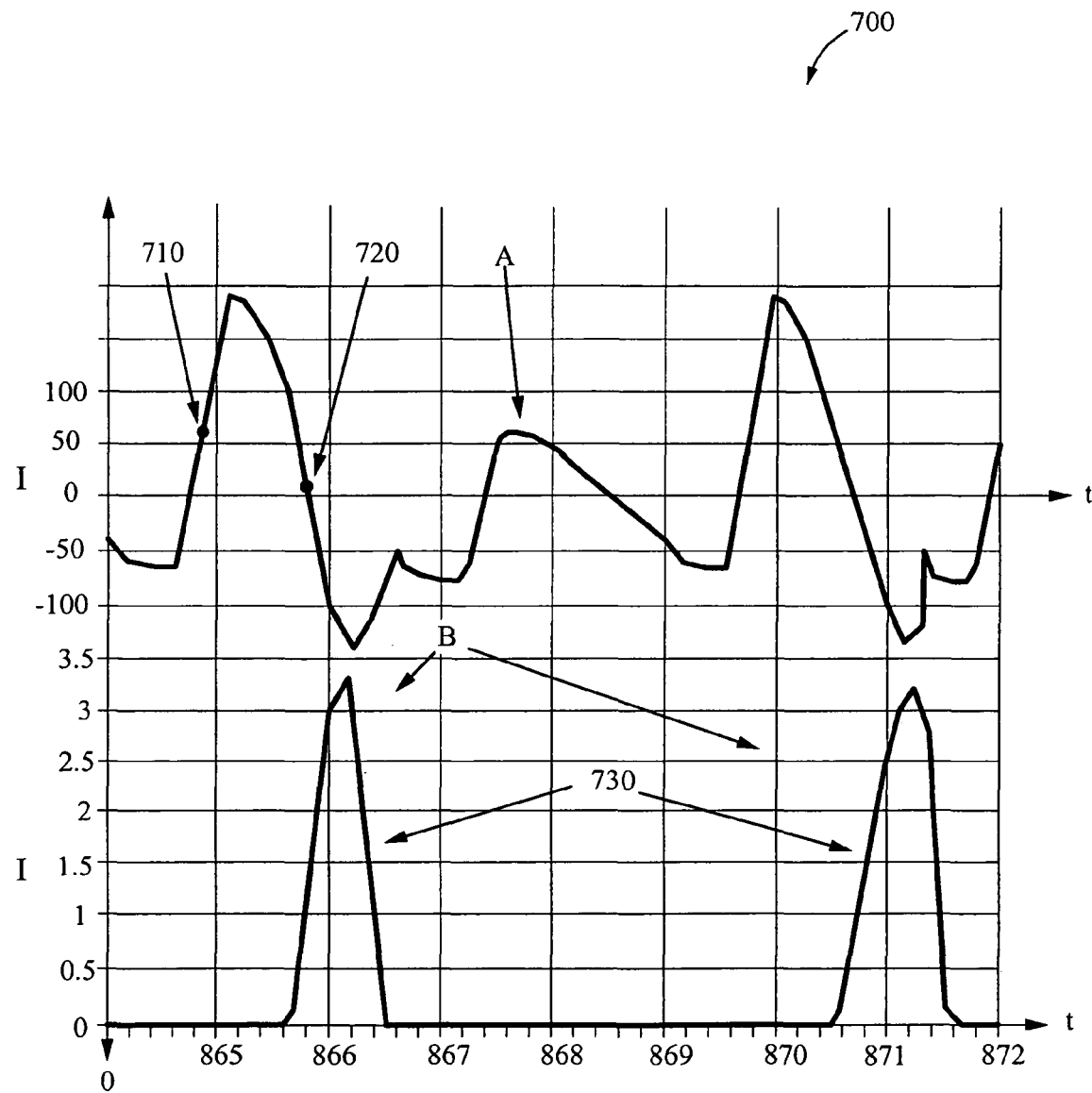
FIG. 7 illustrates a waveform diagram of a power supply apparatus in accordance with an embodiment of the invention.

Turning to FIG. 7, a waveform diagram 700 is shown for the power supply apparatus 300 in accordance with an embodiment of the present invention. A waveform 'A' depicts a current of the primary switch 312 shown at a point 710. A current of the auxiliary switch 314 is shown at the point 720. The current of the primary switch 312 at the point 710 is increasing as the current of the auxiliary switch 314 at the point 720 is decreasing. The waveform 'B' depicts a transformer current 730 of the secondary 340S. In one embodiment, the transformer current 730 in the secondary 340S is greatest when the current 720 through the auxiliary switch 314 is the lowest.

Figure 8:
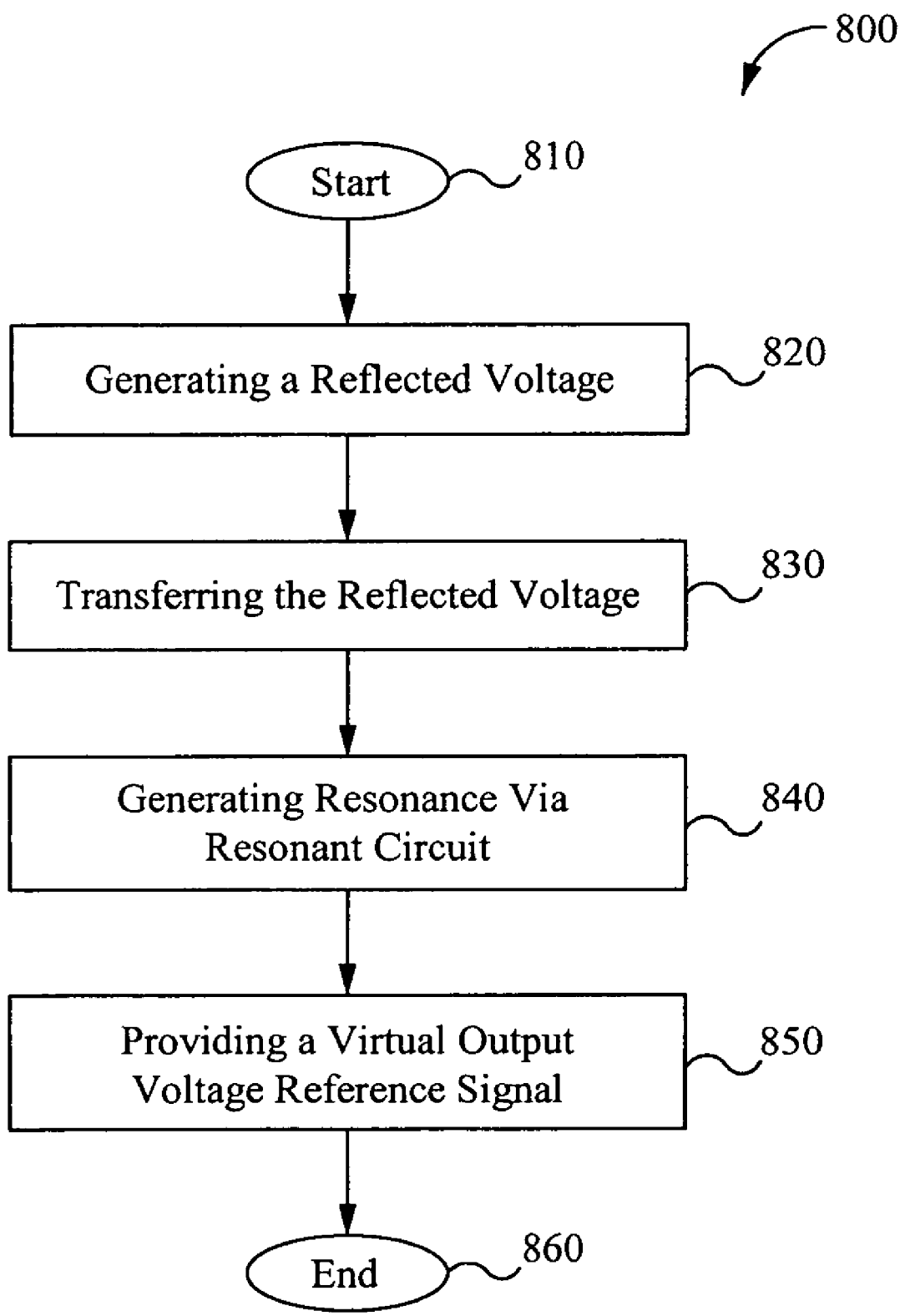
FIG. 8 illustrates a process flow diagram of a method of regulating a power supply apparatus in accordance with an embodiment of the invention.

Turning to FIG. 8, a process flow diagram is shown for a method of regulating the power supply apparatus 300 in accordance with the present invention. The process begins at the step 810. An unregulated DC voltage signal is received at the input node Vin. At the step 820, a reflected voltage signal is generated in the transformer 340 comprising the primary 340P and the secondary 340S. The reflected voltage signal is reflected from the secondary 340S to the primary 340P. In an exemplary embodiment, the primary 340S comprises a single winding and the secondary 340S comprises a single winding. At the step 830, the reflected voltage signal is transferred from the primary 340P to the converter circuit 302. The converter circuit 302 including the primary switch 312 and the auxiliary switch 314. The auxiliary switch 314 is used for transferring the reflected signal to the converter circuit 302.

At the step 840, a transformer resonance is generated using the resonant circuit 327. The resonant circuit 327 is coupled between the power converter 322 and the primary 340P. The resonant circuit 327 includes the first resonance capacitor 308 and the second resonance capacitor 309. The resonant circuit 327 facilitates the transformer resonance by providing the first and second resonance capacitors 308, 309 used to exchange energy between the primary 340P and the resonant circuit 327. The transformer resonance includes the reflected voltage signal, the capacitance of the first and second resonance capacitors 308, 309 and the parasitic capacitance of the transformer 340. The reflected voltage signal is received at the resonant circuit.

Returning to FIG. 4, the power supply apparatus 300 can include a pulse frequency to voltage conversion function as shown in the resonant circuit 400. A pulse train of the resonant circuit 440 is generated within a resonant tank 442 including an inductance of the primary 440P and a first and second resonance capacitor 409, 408. The resonant tank 442 increases a conversion rate of the pulse train to voltage conversion compared to a converter circuit absent of the resonant tank 442. The pulse train is converted to a voltage potential Vo that is proportional to an output current of a load such as the output capacitor 350 (FIG. 3). The voltage potential Vo is generated or produced without the use of additional transformer windings in the primary 440P. The first and second resonance capacitors 409, 408 store reflected voltage from the primary 440P and transfer the stored voltage to the power terminal Vo. The pulse train includes a duty cycle that is proportional to a load current. The op-amp 430 amplifies a voltage generated by the DC voltage source Vb as a factor of the frequency of the pulse train generated in the resonant tank 442. The amplified voltage is controlled and regulated using the reflected voltage Vr of the primary 440P. The reflected voltage Vr is proportional to a factor of a capacitance of the first resonance capacitor divided by the second resonance capacitor. The voltage potential Vo can be used to power the controller 330.

Returning to FIG. 8, at the step 850, a virtual output voltage reference signal is provided to the power converter 322 via the resonant circuit 327. The resonant circuit 327 in cooperation with the primary 340P and the power converter 322 provides the virtual output voltage feedback loop 323. The virtual output voltage reference signal is generated from the reflected voltage signal. The power converter 322 is responsive to the virtual output voltage reference signal in regulating the output voltage Vout. The voltage feedback circuit 313 including the voltage divider 326, 328 is coupled with the primary 340P for sampling the reflected voltage signal and providing the sampled reflected voltage signal to the controller 330. The controller 330 regulates the output voltage Vout by modifying the duty cycle of the primary switch 312 by comparing the sampled reflected voltage signal across the voltage divider 326, 328 with an output voltage reference value to determine a target duty cycle based on an output voltage requirement of the attached device. The turns ratio of the transformer 340 can be used to determine the target duty cycle since the output voltage is proportional to the sampled reflected voltage signal.

The resonant tank of the resonant circuit 327 functions as a DC generator when oscillating to produce a voltage potential that can be used to power the controller 330. In an exemplary embodiment, the produced voltage potential can be supplied without using an additional transformer winding that would be in addition to the single primary winding 340P and the single secondary winding 340S. The auxiliary switch 314 cycles on and off as the resonant tank of the resonant circuit 327 oscillates to produce a turn-on voltage for the auxiliary switch 314. In an exemplary embodiment, the auxiliary switch 314 can be self oscillating to turn-on and off from the turn-on voltage generated by the reflected voltage and the oscillation energy of the resonant tank of the resonant circuit 327. In another embodiment, the auxiliary switch 314 can be cycled on and off or driven by the controller 330. In yet another embodiment, the auxiliary switch 314 can be driven by a switch driving circuit (not shown) that is external to the converter circuit 302. The method 800 ends at the step 860.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

What is claimed is:

1. A power supply apparatus comprising:
a converter circuit comprising a primary switching element and an auxiliary switching element, the auxiliary switching element for transferring a reflected voltage signal;
a transformer comprising a primary and a secondary, the primary coupled with the converter circuit, the primary comprising a single winding and the secondary comprising a single winding;
an output rectifier circuit coupled with the secondary of the transformer; and
a resonant circuit included in the converter circuit, the resonant circuit being coupled with the primary, the resonant circuit comprising one or more resonance capacitors, the one or more resonance capacitors configured for providing a transformer resonance, the transformer resonance comprising the reflected voltage signal, the capacitance of the one or more resonance capacitors and a parasitic capacitance of the transformer, the reflected voltage signal received at the resonant circuit via the auxiliary switching element coupled to the primary, the reflected voltage signal being reflected from the secondary to the primary, the resonant circuit converting a pulse train to produce a voltage potential, the voltage potential varying in proportion to an output voltage, the pulse train comprising a duty cycle proportional to a load current.

2. The apparatus of claim 1, further comprising a virtual output voltage feedback loop, the virtual output voltage feedback loop providing an output voltage reference signal to the converter circuit via the voltage feedback circuit, the output voltage reference signal being generated from the reflected voltage signal, the output voltage reference signal being proportional to the reflected voltage signal sampled by the voltage feedback circuit, the converter circuit responsive to the output voltage reference signal in regulating the output voltage.

3. The apparatus of claim 1, further comprising a voltage feedback circuit including a voltage divider coupled with a controller and coupled with the primary for sampling the reflected voltage.

4. The apparatus of claim 1, wherein the primary switching element and the auxiliary switching element each comprise an n-type MOSFET transistor.

5. The apparatus of claim 1, wherein the first and the second resonance capacitors are coupled in parallel with the primary.

6. The apparatus of claim 1, wherein a controller includes a pulse width modulation (PWM) circuit coupled with the primary switching element.

7. The apparatus of claim 6, wherein the PWM circuit regulates a duty cycle of the primary switching element.

8. The apparatus of claim 1, wherein the converter circuit comprises a flyback converter.

9. The apparatus of claim 1, wherein the converter circuit comprises one of a forward converter, push-pull converter, half bridge converter and a full bridge converter.

10. The apparatus of claim 1, wherein the output rectifier circuit comprises one of a diode, a half-wave rectifier, and a full-wave rectifier.

11. The apparatus of claim 1, further comprising an output capacitor coupled with the output rectifier circuit.

12. The apparatus of claim 1, wherein a resonant tank of the resonant circuit includes the one or more resonance capacitors, coupled with one or more diodes, coupled with the auxiliary switching element, coupled with an inductance of the primary.

13. The apparatus of claim 12, wherein the resonant tank produces the voltage potential used to power a controller.

14. The apparatus of claim 1, wherein a charge pump comprising one more capacitors and a diode is used to store and to couple the produced voltage potential to a controller.

15. A method of regulating a power supply apparatus comprising:
generating a reflected voltage signal in a transformer comprising a primary and a secondary, the reflected voltage signal being reflected from the secondary to the primary, the primary being coupled with a converter circuit, the primary comprising a single winding and the secondary comprising a single winding;
transferring the reflected voltage signal from the primary to the converter circuit, the converter circuit comprising a primary switching element and an auxiliary switching element coupled to the primary, the auxiliary switching element for transferring the reflected voltage signal;
generating a transformer resonance with a resonant circuit included in the converter circuit, the resonant circuit being coupled with the primary, the resonant circuit comprising one or more resonance capacitors, the one or more resonance capacitors configured for providing the transformer resonance, the one or more resonance capacitors and an inductance of the transformer forming a resonant tank; and
converting a pulse train of the resonant circuit to produce a voltage potential, the voltage potential varying in proportion to an output voltage, the pulse train comprising a duty cycle proportional to a load current.

16. The method of claim 15, further comprising storing the reflected voltage in the one or more resonance capacitors and transferring the reflected voltage from the one or more resonance capacitors to a power terminal of the resonant circuit via the pulse train.

17. The method of claim 15, wherein the resonant tank increases a conversion rate of the pulse train to voltage potential conversion.

18. The method of claim 15, wherein a controller includes a pulse width modulation (PWM) circuit coupled with the primary switching element.

19. The method of claim 18, wherein the PWM circuit regulates a duty cycle of the primary switching element.

20. The method of claim 15, wherein the reflected voltage is proportional to a factor of a capacitance of a first resonance capacitor divided by a second resonance capacitor.

21. The method of claim 15, wherein the produced voltage potential is proportional to the load current.

22. The method of claim 15, wherein the transformer resonance comprises the reflected voltage signal, the capacitance of the one or more resonance capacitors and a parasitic capacitance of the transformer.

23. The method of claim 15, further comprising a virtual output voltage feedback loop, the virtual output voltage feedback loop providing an output voltage reference signal to the converter circuit via the voltage feedback circuit, the output voltage reference signal being generated from the reflected voltage signal, the output voltage reference signal being proportional to the reflected voltage signal sampled by the voltage feedback circuit, the converter circuit responsive to the output voltage reference signal in regulating the output voltage.

24. The method of claim 15, further comprising controlling a reset timing of the primary using the resonant circuit.

25. The method of claim 15, further comprising a voltage feedback circuit including a voltage divider coupled with a controller and coupled with the primary for sampling the reflected voltage.

26. The method of claim 15, wherein the primary switching element and the auxiliary switching element each comprise an n-type MOSFET transistor.

27. The method of claim 15, wherein the first and the second resonance capacitors are coupled in parallel with the primary.

28. The method of claim 15, wherein the converter circuit comprises a flyback converter.

29. The method of claim 15, wherein the converter circuit comprises one of a forward converter, push-pull converter, half bridge converter and a full bridge converter.

30. The method of claim 15, further comprising an output rectifier circuit coupled with the secondary of the transformer.

31. The method of claim 30, further comprising an output capacitor coupled with the output rectifier circuit.

32. The method of claim 15, wherein the resonant tank of the resonant circuit further includes the auxiliary switching element and one or more diodes coupled with the auxiliary switching element, the one or more diodes also coupled with the one or more resonance capacitors.

33. The method of claim 15, wherein a charge pump comprising one more capacitors and a diode is used to store and to couple the produced voltage potential to a controller.

34. The method of claim 32, wherein the resonant tank produces the voltage potential used to power a controller.

35. The method of claim 32, wherein the produced voltage potential is supplied without using an additional transformer winding in addition to a single primary winding and a single secondary winding.

36. The method of claim 32, wherein the auxiliary switching element is self-oscillating, the self-oscillating being driven by the reflected voltage and an oscillating energy of the resonant tank.

37. The method of claim 32, wherein the auxiliary switching element is driven by a controller.

38. The method of claim 32, wherein the auxiliary switching element is driven by a switch driving circuit that is external to the converter circuit.

39. A power supply apparatus comprising:

an input capacitor coupled across an input node;

a converter circuit comprising a primary switching element and an auxiliary switching element, the auxiliary switching element for transferring a reflected voltage signal, the converter circuit coupled with the input capacitor;

a transformer comprising a primary and a secondary, the primary coupled with the converter circuit, the primary comprising a single winding and the secondary comprising a single winding;

an output rectifier circuit coupled with the secondary of the transformer; and a resonant circuit included in the converter circuit, the resonant circuit being coupled with the primary, the resonant circuit comprising one or more resonance capacitors, the one or more resonance capacitors configured for providing a transformer resonance, the transformer resonance comprising the reflected voltage signal and the capacitance of the one or more resonance capacitors, the reflected voltage signal received at the resonant circuit via the auxiliary switching element coupled to the primary, the reflected voltage signal being reflected from the secondary to the primary, the resonant circuit converting a pulse train to produce a voltage potential, the voltage potential varying in proportion to an output voltage, the pulse train comprising a duty cycle proportional to a load current.

40. The apparatus of claim 39, further comprising a virtual output voltage feedback loop, the virtual output voltage feedback loop providing an output voltage reference signal to the converter circuit via the voltage feedback circuit, the output voltage reference signal being generated from the reflected voltage signal, the output voltage reference signal being proportional to the reflected voltage signal sampled by the voltage feedback circuit, the converter circuit responsive to the output voltage reference signal in regulating the output voltage.

41. The apparatus of claim 39, further comprising a voltage feedback circuit including a voltage divider coupled with a controller and coupled with the primary for sampling the reflected voltage.

* * * * *